US009641275B2

(12) United States Patent
Manna (10) Patent No.: US 9,641,275 B2
(45) Date of Patent: May 2, 2017

(54) SYMMETRIC OPTICAL MULTIPLEXING NODE

(75) Inventor: Massimo Manna, New York, NY (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 90 days.

(21) Appl. No.: 13/163,290

(22) Filed: Jun. 17, 2011

(65) Prior Publication Data

US 2015/0256282 A1  Sep. 10, 2015

(51) Int. Cl.
*H04J 14/02* (2006.01)

(52) U.S. Cl.
CPC ...... *H04J 14/0215* (2013.01); *H04J 14/0204* (2013.01); *H04J 14/0205* (2013.01); *H04J 14/0206* (2013.01); *H04J 14/0213* (2013.01); *H04J 14/0217* (2013.01)

(58) Field of Classification Search
CPC . H04J 14/0213; H04J 14/0204; H04J 14/0205
USPC .......................................................... 398/83
See application file for complete search history.

(56) References Cited

U.S. PATENT DOCUMENTS

| | | | | |
|---|---|---|---|---|
| 6,035,080 A * | 3/2000 | Henry | ................ | G02B 6/12007 385/16 |
| 6,310,994 B1 | 10/2001 | Jones et al. | | |
| 6,934,473 B2 | 8/2005 | Stephens | | |
| 7,627,245 B2 * | 12/2009 | Jenkins | ............... | H04J 14/0204 398/57 |
| 8,032,027 B2 * | 10/2011 | Popovic | ............. | G02B 6/12007 398/82 |
| 8,111,994 B2 * | 2/2012 | Popovic | ............. | G02B 6/12007 359/247 |
| 8,126,330 B2 * | 2/2012 | Wisseman | .......... | H04J 14/0212 398/2 |
| 2002/0057474 A1 * | 5/2002 | Boroditsky | ......... | H04J 14/0206 398/59 |
| 2002/0071151 A1 * | 6/2002 | Zaacks | ................ | H04J 14/0201 398/45 |
| 2002/0101633 A1 * | 8/2002 | Onaka | ................. | H04J 14/0204 398/59 |

(Continued)

FOREIGN PATENT DOCUMENTS

| | | |
|---|---|---|
| EP | 0818897 A2 | 1/1998 |
| JP | 09153861 | 6/1997 |
| JP | 09289491 | 11/1997 |

OTHER PUBLICATIONS

Balasubramanian "Design and Protection Algorithms for Path Level Aggregation of Traffic in WDM Metro Optical Networks," Iowa State University (2007) pp. 1-195.

*Primary Examiner* — David Payne
*Assistant Examiner* — Tanya Motsinger (57) ABSTRACT

Techniques for communications using optical fiber are disclosed. An optical add/drop multiplexer (OADM) node includes an interface to a first fiber pair connecting a first trunk station and a second trunk station. The OADM node further includes an interface to a second fiber pair connecting the first trunk station and the second trunk station with a branch station. The OADM node includes a plurality of filters configured to provide connectivity between the first trunk station, the second trunk station and the branch station. Other embodiments are described and claimed.

18 Claims, 6 Drawing Sheets

(56) References Cited

U.S. PATENT DOCUMENTS

| | | | |
|---|---|---|---|
| 2002/0105692 A1* | 8/2002 | Lauder | H04J 14/0208 398/83 |
| 2002/0150328 A1* | 10/2002 | Morgan | H04B 10/2972 385/24 |
| 2002/0163689 A1 | 11/2002 | Matsushita et al. | |
| 2003/0002104 A1* | 1/2003 | Caroli | H04J 14/0204 398/82 |
| 2004/0151426 A1* | 8/2004 | Boertjes | H04B 10/2513 385/24 |
| 2004/0247234 A1* | 12/2004 | Young | H04J 14/02 385/15 |
| 2004/0247239 A1* | 12/2004 | Eldada | G02B 6/12007 385/27 |
| 2005/0117907 A1* | 6/2005 | Claringburn | H04J 14/0204 398/83 |
| 2005/0281295 A1* | 12/2005 | Fishman | H04J 14/0204 370/535 |
| 2006/0115268 A1* | 6/2006 | Zirnheld | H04B 10/038 398/59 |
| 2006/0127086 A1* | 6/2006 | Frankel | H04B 10/2918 398/19 |
| 2006/0159003 A1* | 7/2006 | Nanda | H04W 16/10 370/203 |
| 2007/0160372 A1* | 7/2007 | Eberlein | H04J 14/02 398/83 |
| 2008/0253767 A1* | 10/2008 | Galli | H04J 14/0206 398/45 |
| 2008/0298805 A1* | 12/2008 | Lee | H04J 14/0246 398/48 |
| 2010/0008672 A1 | 1/2010 | Kovsh et al. | |
| 2010/0142961 A1* | 6/2010 | Wisseman | H04J 14/0212 398/83 |
| 2010/0202778 A1* | 8/2010 | Wisseman | G02B 6/2931 398/83 |
| 2010/0303128 A1* | 12/2010 | Isley | H04L 12/5601 375/132 |
| 2011/0076016 A1* | 3/2011 | Wisseman | H04J 14/0204 398/48 |
| 2011/0197188 A1* | 8/2011 | Srinivasan | G06F 8/60 718/1 |
| 2011/0222486 A1* | 9/2011 | Hart | H04L 5/001 370/329 |
| 2011/0317997 A1* | 12/2011 | Satou | H04B 10/0771 398/20 |
| 2012/0002964 A1* | 1/2012 | Takatsu | H04J 14/0204 398/50 |

* cited by examiner

FIG. 1

Prior Art

SYMMETRIC OPTICAL MULTIPLEXING NODE

FIELD

Embodiments of the present disclosure relate to a symmetrical optical add and drop multiplexing node used within fiber optic communications networks. More particularly, the present disclosure relates to symmetrical optical add and drop multiplexing node that is configured to allow communication between two end stations of a trunk and a branch station using the same number of fiber pairs in the trunk stations and the branch station.

BACKGROUND

Undersea fiber optic communication systems may include a main trunk path extending between land-based cable stations. The main trunk is defined by an undersea cable having a plurality of optical fibers therein and one or more repeaters or optical amplifiers disposed along the trunk path used to amplify optical signals transmitted between the cable stations. Each cable station includes terminal equipment used to transmit and receive these optical signals along the main trunk path. Such undersea systems may also include one or more branch segments which are coupled to the trunk by a branching unit (BU). A branch segment extends from the branching unit connected along the main trunk to a branch segment cable station. Trunk cable stations may be used to carry information signals through the backbone of the network while branch cable stations may be used to add or drop traffic from the trunk path. The optical signals transmitted between the cable stations are typically dense wavelength-division multiplexed (DWDM) signals in which a plurality of optical channels, each at a respective wavelength, are multiplexed together.

Figure 1:
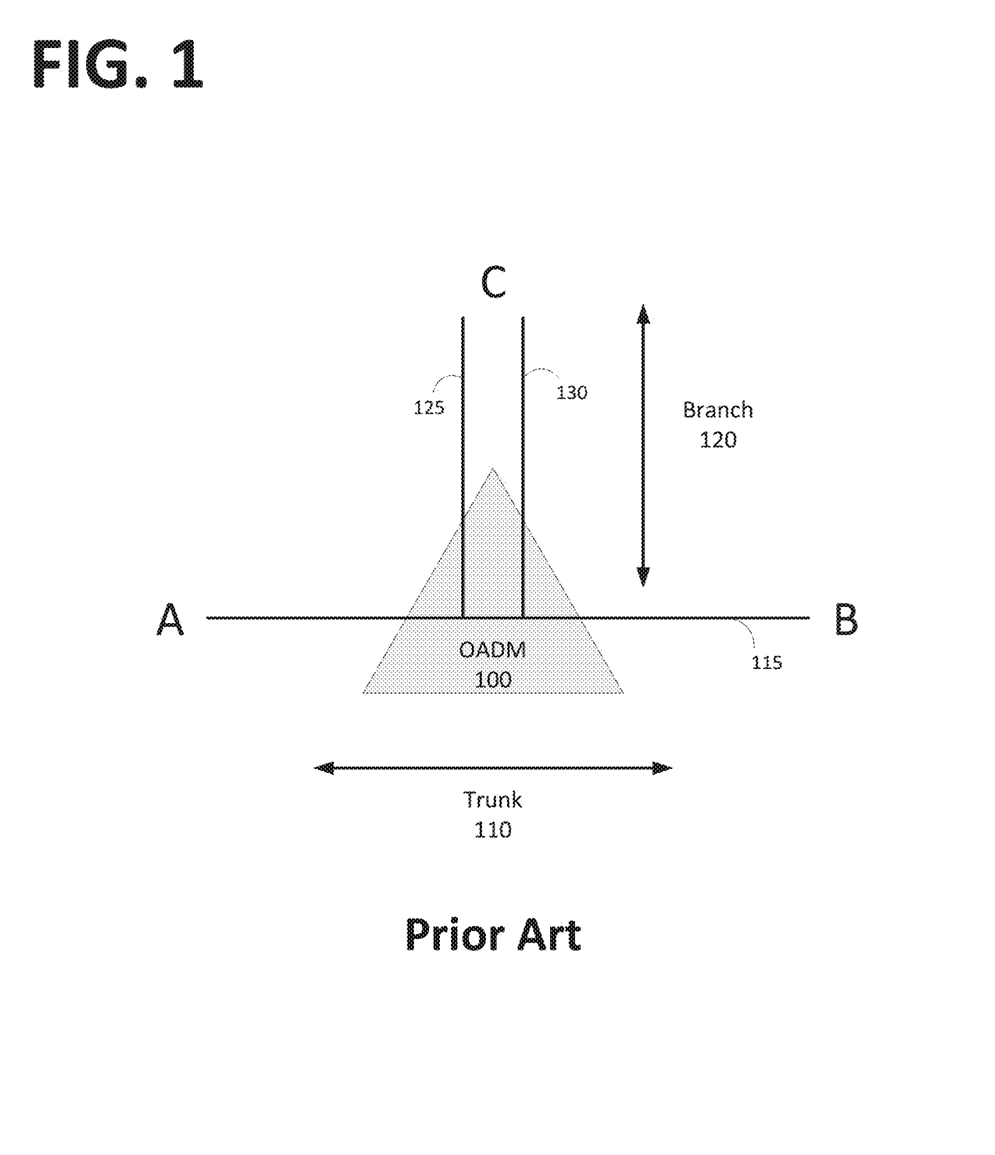
FIG. 1 illustrates a simplified conventional trunk and branch network.

FIG. 1 illustrates a conventional and simplified trunk and branch network configuration including trunk 110 disposed between cable stations A and B and a branch segment 120 connecting cable station C to trunk 110 via optical add-drop multiplexer (OADM) node 100. In general, an OADM node is used to add and/or drop channels within a DWDM optical signal between the cable stations and may be implemented in one or more separate units or bodies which are connected via cabled fibers. Again, trunk path 110 is defined by an optical cable having a plurality of optical fiber pairs 115, one or more optical amplifiers disposed along the optical cable as well as other optical/electrical equipment used to transmit optical signals from cable station A to B (A-B) and/or from cable station B to A (B-A). Typically, the optical signals or "through traffic" travel along trunk 110 between cable stations A and B, whereas signals destined for cable station C are added/dropped from the trunk 110 using OADM 100 and supplied to branch segment 120. For each fiber pair 115 along trunk 110 there are two corresponding fiber pairs 125 and 130 within branch segment 120 in order to provide transmission capacity in both directions from OADM 100 to cable station C thereby supporting connectivity between all three cable stations A, B and C. In particular, if trunk 110 includes eight (8) fiber pairs, and all fiber pairs on the trunk support connectivity of cable stations A and B with cable station C, then branch segment 120 would include sixteen (16) fiber pairs to accommodate transmission to/from cable station C. In the current state of the art, if one branch fiber pair per trunk fiber pair is used, then it is not possible to have connectivity between each combination of two of the three end stations. Therefore, given one trunk fiber pair and one branch fiber pair there can be either connectivity between A and C (A-C) and between A and B (A-B); or connectivity between B and C (B-C) and between A and B (A-B); but there cannot be connectivity of all three A-C, A-B and B-C on the trunk fiber pair.

Because the undersea cable used to connect cable station C to OADM 100 includes twice the number of fiber pairs as compared to the cable for trunk path 110, the cable and the associated optical repeaters manufactured for branch segment 120 will be more costly to support the higher number of fiber paths and optical amplifiers respectively. In addition, the spectral efficiency of branch segment 120 will be low compared to the spectral efficiency of trunk path 110 since multiple fiber pairs are required for bidirectional traffic. In particular, spectral efficiency is the information rate transmitted or total transmission capacity over a given bandwidth within a communication network or in this case, branch segment 120. In other words, by more efficiently using available spectral bandwidth the greater the spectral efficiency. For the branch segment 120, one of the fiber pairs (e.g. 130) accommodates traffic to/from OADM 100 from/to cable station C and the other fiber pair (e.g. 125) accommodates traffic to/from cable station C from/to OADM 100. Since there are separate fiber pairs to accommodate directional traffic, spectral efficiency for each of the two fiber pairs 125 and 130 in the branch is lower as compared to the spectral efficiency of the corresponding trunk fiber pair 115. In the conventional optical networks, if a one to one correspondence of fiber pairs in the branch segment to the trunk path is used, then connectivity between each combination of two of the three end stations A, B and C is not possible. For example, in conventional exemplary networks, fiber pair 130 in branch segment 120 would be exclusively dedicated to bidirectional communication between cable stations B and C, and fiber pair 125 in branch segment 120 would be exclusively dedicated to bidirectional communication between cable stations A and C. Therefore if fiber pair 130 (alternatively 125) is not implemented in branch segment 120 then the corresponding connectivity between B and C (alternatively A and C) will not be present in OADM node 100. Therefore, given one trunk fiber pair and one branch fiber pair, in a conventional optical network there can be either connectivity between A and C (A-C) and between A and B (A-B) if branch fiber pair 125 is implemented and branch fiber 130 is not implemented; or connectivity between B and C (B-C) and between A and B (A-B) if branch fiber pair 130 is implemented and branch fiber pair 125 is not implemented. However, both fiber pairs 125 and 130 have to be implemented in branch 120 to allow for all three of A-C, A-B and B-C connections via OADM node 100 to be present as shown in FIG. 1. Thus, a need exists for an OADM node that allows for symmetric fiber pairs to be used. That is, for each fiber pair in the trunk, only a single corresponding fiber pair is needed in a branch to enable connectivity between each combination of two of three end stations. It is with respect to these and other considerations that the present improvements have been needed.

SUMMARY

The following presents a simplified summary in order to provide a basic understanding of some novel embodiments described herein. This summary is not an extensive overview, and it is not intended to identify key elements or to delineate the scope thereof. Its sole purpose is to present some concepts in a simplified form as a prelude to the more detailed description that is presented later.

Embodiments of the present disclosure relate to a symmetrical optical add and drop multiplexing node used within fiber optic communications networks. More particularly, the present disclosure relates to symmetrical optical multiplexing node that is configured to allow communication between two end stations of a trunk and a branch station using the same number of fiber pairs in the trunk stations and the branch station.

In an embodiment, an OADM node is configured to allow connectivity between a branch station and both end stations of a trunk using only one branch fiber pair per fiber pair in the trunk. The solution may provide a more efficient and less expensive way to provide traffic from a trunk station to a branch station. In one embodiment, for example, a series of filters are configured within an OADM node to allow for connectivity between a branch station and both end stations of a trunk using only a single fiber pair in the branch for each fiber pair in the trunk. In addition, an embodiment may be used to connect low bandwidth legacy systems with higher bandwidth new systems using only a single fiber pair in the branch for each fiber pair in the trunk. Other embodiments are described and claimed.

An embodiment may include an OADM node comprising an interface to a first fiber pair connecting a first trunk station and a second trunk station, an interface to second fiber pair connecting the first trunk station and the second trunk station with a branch station, and a plurality of filters configured to provide connectivity between the first trunk station, the second trunk station and the branch station.

In a further embodiment, a symmetric OADM node may include a plurality of bypass switches. Each switch may be configured to bypass one or more filters when a fault has been detected on a first fiber pair or a second fiber pair. The plurality of bypass switches may include the same number of switches as bands supported by a first trunk station and a second trunk station.

In an embodiment, a first trunk station, a second trunk station and a branch station may each support a first band, a second band and a third band. The first band may carry traffic between a branch station and a first trunk station, the second band may carry traffic between the first trunk station and a second trunk station, and the third band may carry traffic between the second trunk station and the branch station.

In an embodiment, a first trunk station may support a first band and a second band, a second trunk station may support the first band, the second band, a third band and a fourth band and a branch station may support the first band, the second band, the third band and the fourth band. In this embodiment, the first trunk station may be a legacy station with a lower bandwidth capability than the second trunk station or the branch station. The first band may carry traffic between the branch station and the second trunk station, the second band may carry traffic between the branch station and the first trunk station, the third band may carry traffic between the first trunk station and the second trunk station, and the fourth band may carry traffic between the branch station and the second trunk station.

To accomplish the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Various embodiments are directed to a symmetrical optical add and drop multiplexing node for use within fiber optic communications networks. More particularly, the present disclosure relates to a symmetrical optical add and drop multiplexing node that is configured to allow communication between two end stations of a trunk and a branch station using the same number of fiber pairs to carry bidirectional traffic between the trunk stations and between a trunk and the branch station.

In one embodiment, a fiber optic system may include an OADM node comprising an interface to a first fiber pair connecting a first trunk station and a second trunk station, an interface to second fiber pair connecting the first trunk station and the second trunk station with a branch station, and a plurality of filters configured to provide connectivity between the first trunk station, the second trunk station and the branch station.

Other embodiments are described and claimed. Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, wellknown structures and devices are shown in block diagram form in order to facilitate a description thereof. The intention is to cover all modifications, equivalents, and alternatives falling within the spirit and scope of the claimed subject matter.

Figure 2:
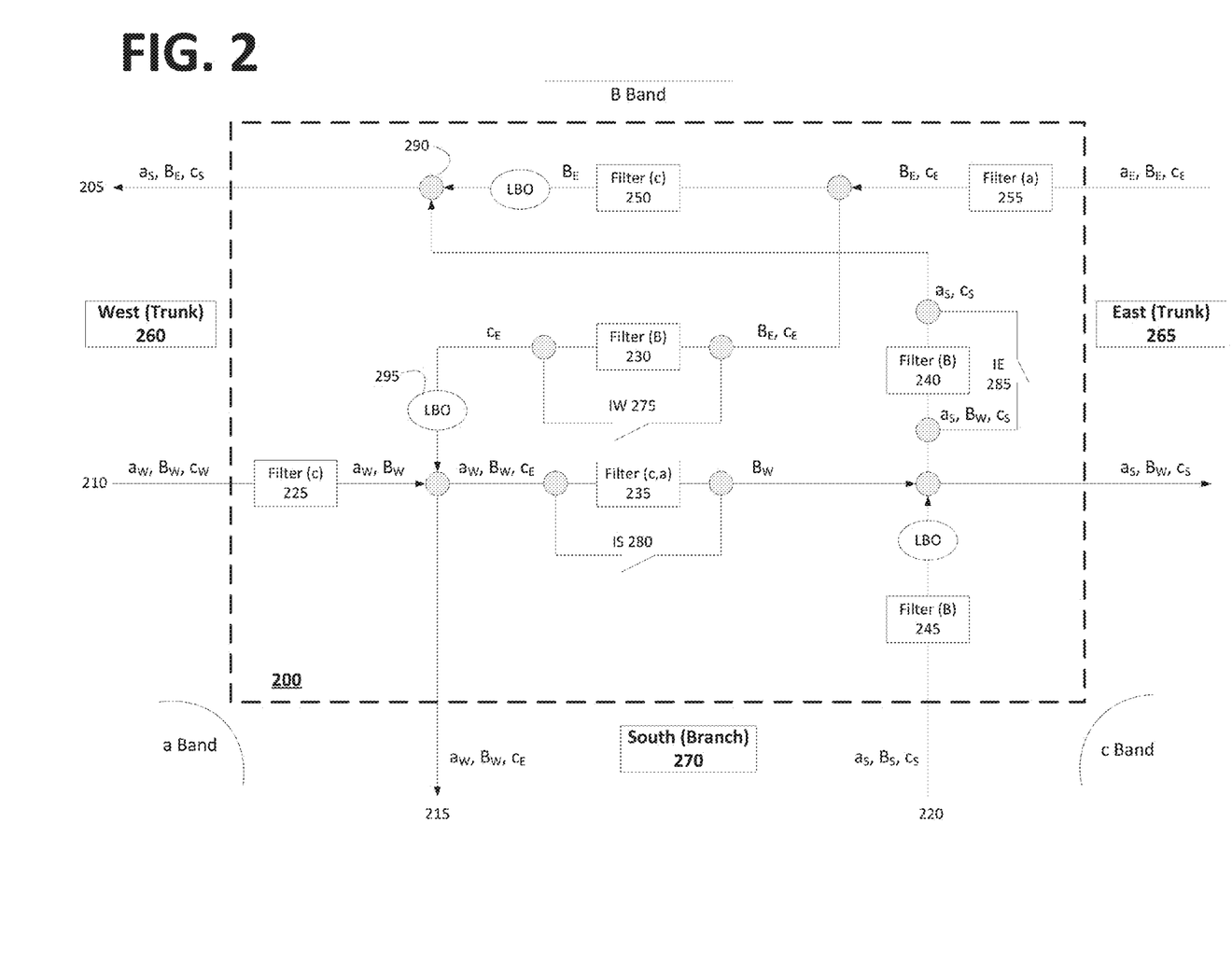
FIG. 2 illustrates an embodiment of a symmetric OADM node in accordance with an exemplary embodiment of the present disclosure.

FIG. 2 illustrates an OADM node 200 according to one embodiment. Although the OADM node 200 shown in FIG. 2 has a limited number of elements in a certain topology, it may be appreciated that the OADM node 200 may include more or less elements in alternate topologies as desired for a given implementation. In an embodiment, each solid line, 205, 210, 215, 220, represents a fiber cable, thus two solid lines represent each fiber pair. The fiber pairs may be used to carry data in the form of DWDM signals along a main trunk path and between the main trunk path and one or more branch segments connected using a BU. Fiber cable may be connected within OADM node 200 using one or more couplers or splitters, such as coupler/splitter 290, for example. Coupler/splitter 290 may include one or more coupler or splitting devices, such that traffic along a fiber cable can be combined or split. Further, OADM node 200 may include one or more loss build-out units (LBO), such as LBO 295, which may be used to manage span loss.

In an embodiment, OADM node 200 may be symmetric in that each leg of the node interfaced with the same number of fiber pairs and each fiber pair carries two of the three available traffic bands, a, B and c, intended for an end destination. The third band, unused by a fiber pair, may carry loading wavelengths not intended for the destination cable station at the end of the fiber pair. For example, the South branch station 270 may carry bidirectional traffic on the a-band and c-band, and may receive the $B_W$ band from the West trunk station 260 as loading wavelengths.

In an embodiment, fiber pair 205, 210 is used to carry traffic along the East-West trunk link between West trunk station 260 and East trunk station 265. Fiber pair 215, 220 is used to carry add/drop traffic from the trunk to South branch station 270. OADM node 200 may include an interface configured to connect to fiber pair 205, 210 at West trunk station 260 and East trunk station 265. OADM node 200 may further include an interface configured to connect to fiber pair 215, 220 to carry traffic between West trunk station 260 and East trunk station 265 and South branch station 270. As shown in FIG. 2, symmetric OADM node 200 may allow for connectivity for the South-East link, South-West link and East-West link while having only one fiber pair 215, 220 along the branch and one fiber pair 205, 210 along the trunk. In previous solutions, having a single fiber pair along the branch and a single fiber pair along the trunk only supported communications for the East-West link and one of either the West-South Link or East-South link, resulting in the need for an additional fiber pair in the branch to support all three links East-West, West-South and East-South, thus leading to a lower spectral efficiency for each of the branch fiber pairs.

Each station, West 260, East 265 and South 270 may support one or more optical bands, which may comprise DWDM signals. An optical band may be divided into three sub-bands, a, B and c, for example, each at its own respective wavelength range or plurality of wavelengths. However, more or less bands or sub-bands may be used. The a-band may be reserved for traffic between West trunk 260 and South branch 270. The B-band may be reserved for traffic between West trunk 260 and East trunk 265. The c-band may be reserved for traffic between a Trunk-East link and a South-Branch link. While only a single OADM node is shown, it can be appreciated that any number of OADM nodes may be placed along a trunk and connected to the trunk using corresponding BUs. One or more bands, such as the a and c bands, may be used to carry traffic throughout the OADM nodes. Further, it should be noted that a trunk cable may include many fiber pairs with the branch cable having the same number of fiber pairs. Each fiber pair in the trunk will be connected to one fiber pair in the branch via an OADM node.

FIG. 2 identifies the origin of traffic along the three optical bands, a, B and c. For example, $a_S$, $B_S$ and $c_S$ indicates that the traffic on bands a, B and c originated from South branch station 270. Bands $a_W$, $B_W$, $c_W$ indicate that traffic on bands a, B and c originated from West trunk station 260. Likewise, $a_E$, $B_E$, $c_E$ indicates that traffic on bands a, B and c originated from East trunk station 265, and so forth.

In an embodiment, OADM node 200 may include one or more filters used to control the flow of traffic between the various stations. Each filter may include one or more filter devices capable of blocking or suppressing one or more optical bands. For example a filter (a) 255 may be used to suppress the a-band originating from East trunk station 265. Likewise, a filter (c) 250 may suppress c-band traffic originating from East trunk station 265. Filter (c,a) 235 may be used to suppress both c and a bands, and so forth. Filters 225, 230, 235, 240, 245, 250 and 255 may be configured to provide connectivity between West trunk station 260, East trunk station 265 and South branch station 270 using a single fiber pair 205, 210 along the trunk and a single fiber pair 215, 220 along the branch. For example, filters 225, 230, 235, 240, 245, 250 and 255 may be configured to provide connectivity such that the a-band may be reserved for traffic between West trunk 260 and South branch 270, the B-band may be reserved for traffic between West trunk 260 and East trunk 265, and the c-band may be reserved for traffic between a Trunk-East link and a South-Branch link. An exemplary filter configuration is illustrated within FIG. 2, however, it can be appreciated that alternative filter configurations may be used. The embodiments are not limited by this example.

In an embodiment, filters 225 and 250 both reject the C band and may have the same design such as, for example, fiber Bragg gratings, interference filters, etc. Filters 230, 240 and 245 may also have the same design which may be the same or different from that of filters 225 and 250. However, the embodiments are not limited by this example and alternative filter configurations may be employed to control the flow of traffic between the various cable stations.

In an embodiment, OADM node 200 may include three switches that may be used in the event of a fault. A fault may be caused by system going down within a station, losing power or a cable being cut, for example. The number of bypass switches used may correspond to the number of bands supported by one or more of the trunk or branch stations. More or less switches may be used. In an embodiment, if a fiber cable cut resulting in a fault occurs in West trunk 260, switch IW 275 may be used to bypass filter 230 to reinstate the band $B_E$ towards its origin and towards fiber 215 so that the received spectrum in East trunk station 265 would be $a_S$, $B_E$ and $c_S$ and therefore the bidirectional traffic carried in the c-Band between South Branch station 270 and East trunk station 265 can be maintained. The power in $B_E$ may be adjusted directly, locally, from the receive station to maintain relative powers between optical Bands even after a fault occurs in West trunk 260. Likewise, the switch IS 280 may be used to bypass filter 235 in case of a cable fault in the South branch station 270. The switch IE 285 is used to bypass filter 240 in case of a cable fault in the East trunk 265 and reinstates the band $B_W$ towards its origin, so that the received spectrum in the West trunk station 260 would be $a_S$, $B_W$ and $c_S$ and the power in $B_W$ can be adjusted locally from the receive portion of West trunk station 260 to maintain relative powers between optical Bands even after a fault occurs in the East trunk 265. The utilization of switches 275, 280 and 285 may allow the OADM node 200 to keep loading all three bands, a, B and c, for each fiber pair. The embodiments are not limited by this example.

Figure 3:
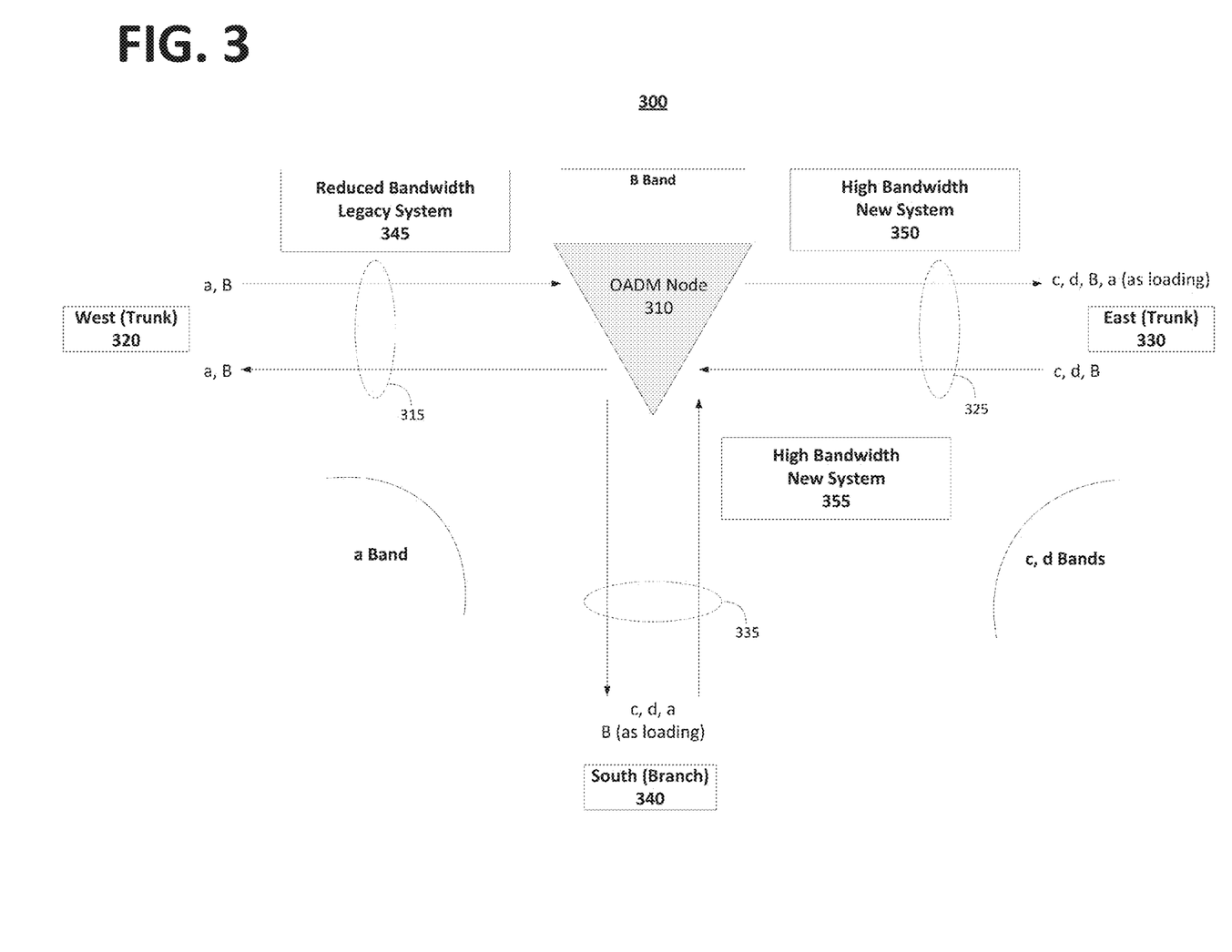
FIG. 3 illustrates an embodiment of a symmetric OADM node in accordance with an exemplary embodiment of the present disclosure.

FIG. 3 illustrates a fiber optic communications system 300 in which OADM node 310 is used to connect a reduced bandwidth legacy system 345 with higher bandwidth new systems 350 and 355. For example, a legacy system, such as system 345, may support a lower bandwidth, supporting only two optical bands, a and B. A newer system, such as systems 350 and 355, may support a higher bandwidth including four optical bands, a, B, c and d. In an embodiment, symmetric OADM node 310 may be placed along a trunk between a legacy system including West trunk station 320 and a newer system including East trunk station 330 that supports the legacy optical bands and includes additional optical bands. A branch, such as South branch station 340, may support the same bands as East trunk station 330.

Fiber optic communication system 300 may include symmetric OADM node 310, which allows for connectivity between West trunk station 320, East trunk station 330 and South branch station 340 using the same number of fiber pairs along the trunk and branch. For example, the trunk link between West trunk station 320 and East trunk station 330 includes a single fiber pair depicted in two segments, 315 and 325. Likewise, South branch station 340 is connected to the trunk using a single fiber pair 335.

As illustrated within FIG. 3, the a-band may be used to communicate on the West-South link, the B-band may be used to communicate on the West-East link and the c and d bands may be used to communicate on the East-South link. The South branch station 340 may use the wavelengths contained in the B-band as loading wavelengths. The East trunk station 330 may use the wavelengths in the a-band as loading wavelengths to achieve uniform loading on the fiber pair 325 and thus achieve more effective control of powers on the wavelengths in the other three bands B, c and d carrying traffic for the intended destination. Likewise the South branch station 340 may use the wavelengths in the B-band as loading wavelengths to achieve uniform loading on fiber pair 335 and thus achieve more effective control of powers on the wavelengths in the other three bands a, c and d carrying traffic for the intended destination. In this example, the bands of the legacy system are used at 100% efficiency. The embodiments are not limited by this example.

Figure 4:
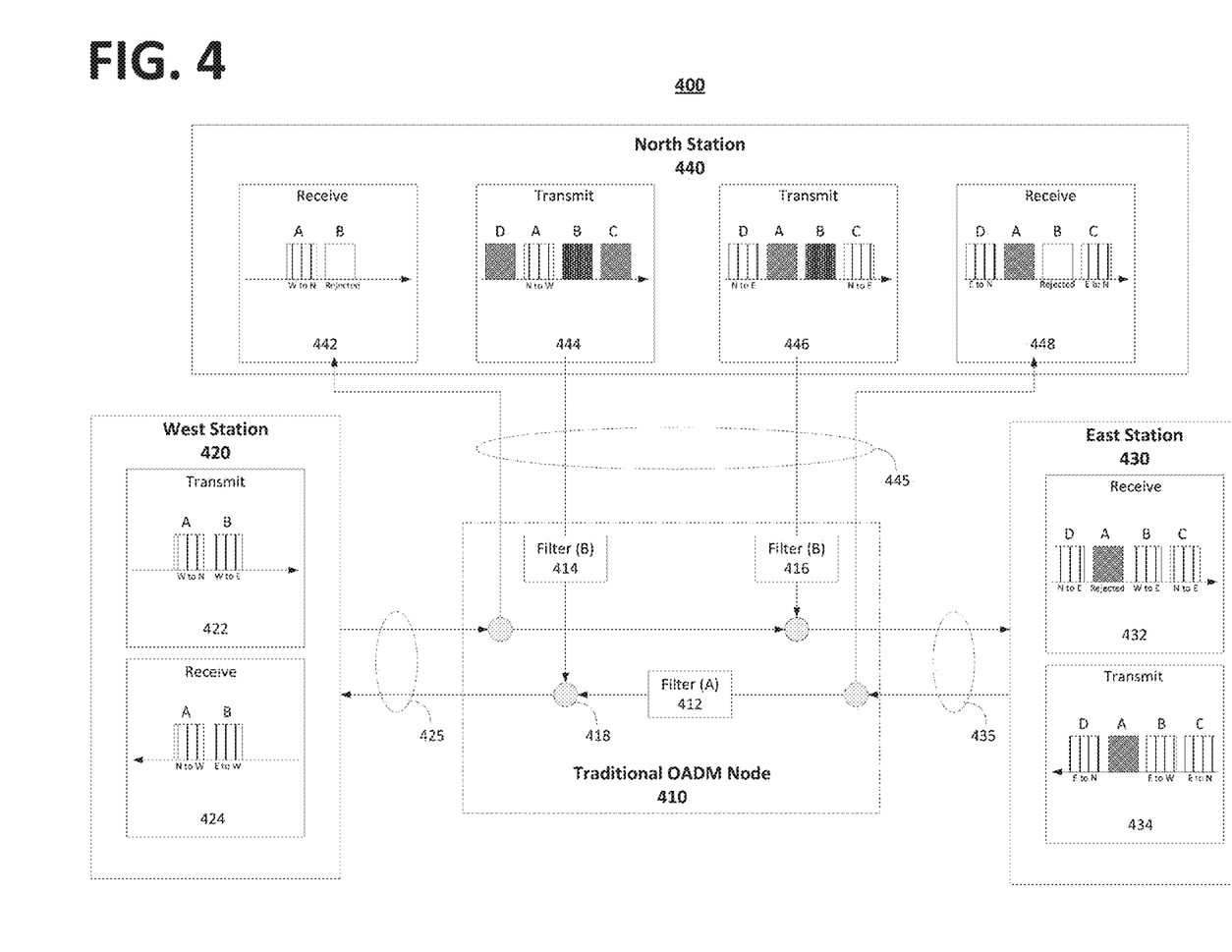
FIG. 4 illustrates a trunk and branch network OADM node in accordance with an exemplary embodiment of the present disclosure.

FIG. 4 illustrates an exemplary fiber optic communications system 400 employing OADM node 410 that may be used to connect a legacy system with one or more newer, higher bandwidth, systems. OADM node 410 may include one or more couplers or splitters, such as coupler/splitter 418, for example. Coupler/splitter 418 may include one or more coupler or splitting devices, such that traffic along a fiber cable can be combined or split. OADM node 410 may further include a plurality of filters used to control the flow of traffic between the various stations. For example, filter 412 may be used to suppress the A-band originating from East trunk station 430. Filters 414 and 416 may be used to suppress the B-bands originating from the transmit modules 444 and 446 in North branch station 440.

Fiber optic communications system 400 may include a West legacy trunk station 420, which includes transmit module 422 and receive module 424. West trunk station 420 may be of limited optical bandwidth, supporting only two optical bands, for example. System 400 may further include East trunk station 430, which supports four bands as opposed to two bands supported by West trunk station 420 because fiber pair 435 may be newer than fiber pair 425 thus supporting a higher bandwidth. East trunk station may include transmit module 434 and receive module 432. West trunk station 420 and East trunk station 430 may be connected using a single fiber pair represented by segments 425 and 435. North branch station 440, may be a newer, higher bandwidth, system supporting four bands. North branch station may be connected to OADM node 410 using two fiber pairs 445. Each fiber pair is associated with a transmit and receive module within North branch station 440. For example, North branch station 440 may include receive module 442, transmit module 444, transmit module 446 and receive module 448.

Optical bands within each transmit and receive module are coded to illustrate the bands transmitted or received. For example, striped bands, such as the A-band within receive module 442, indicate that data traffic over active wavelengths is transmitted or received in a particular direction, labeled below. In the case of the A-band within module 442, data traffic is carried over the A-band from West trunk station 420 to North branch station 440. Shaded bands, such as the D-band, C-Band or B-band of transmit module 444, indicate that only noise loading or continuous wave (CW) tones are transmitted or received. Blank bands, such as the B-band within receive module 442, indicate that the band may be blocked at the receive module since the band does not carry data traffic intended for the specific module. The embodiments are not limited by this example.

As illustrated, an extra fiber pair is required within the branch and the fiber pairs are not used efficiently. For example, the A-band carries traffic over the West-North link in both directions. The B-band carries traffic over the West-East link in both directions. The C and D-bands carry traffic on the North-East link in both directions. However, the C and D-bands cannot carry traffic over the West-East link as the West station 420 does not support C and D-bands. The available bands from the West station 420 must be split to allow connectivity between the West trunk station 420 and both the North branch station 440 and East trunk station 430. Further, the North branch station 440 fiber pairs 445, while being high bandwidth, can only carry traffic on limited number of bands. For example, the fiber pair connected to modules 442 and 444 can only carry data traffic to/from North Station 440 on the A-band and the other fiber pair connected to modules 446 and 448 can only carry data traffic to/from North Station 440 on the C and D-bands. This is an inefficient use of the high bandwidth fiber pairs 445. As illustrated, it takes two fiber pairs, 445, to accomplish connectivity between the North branch station 420 and both the West trunk station 420 and East trunk station 430.

Figure 5:
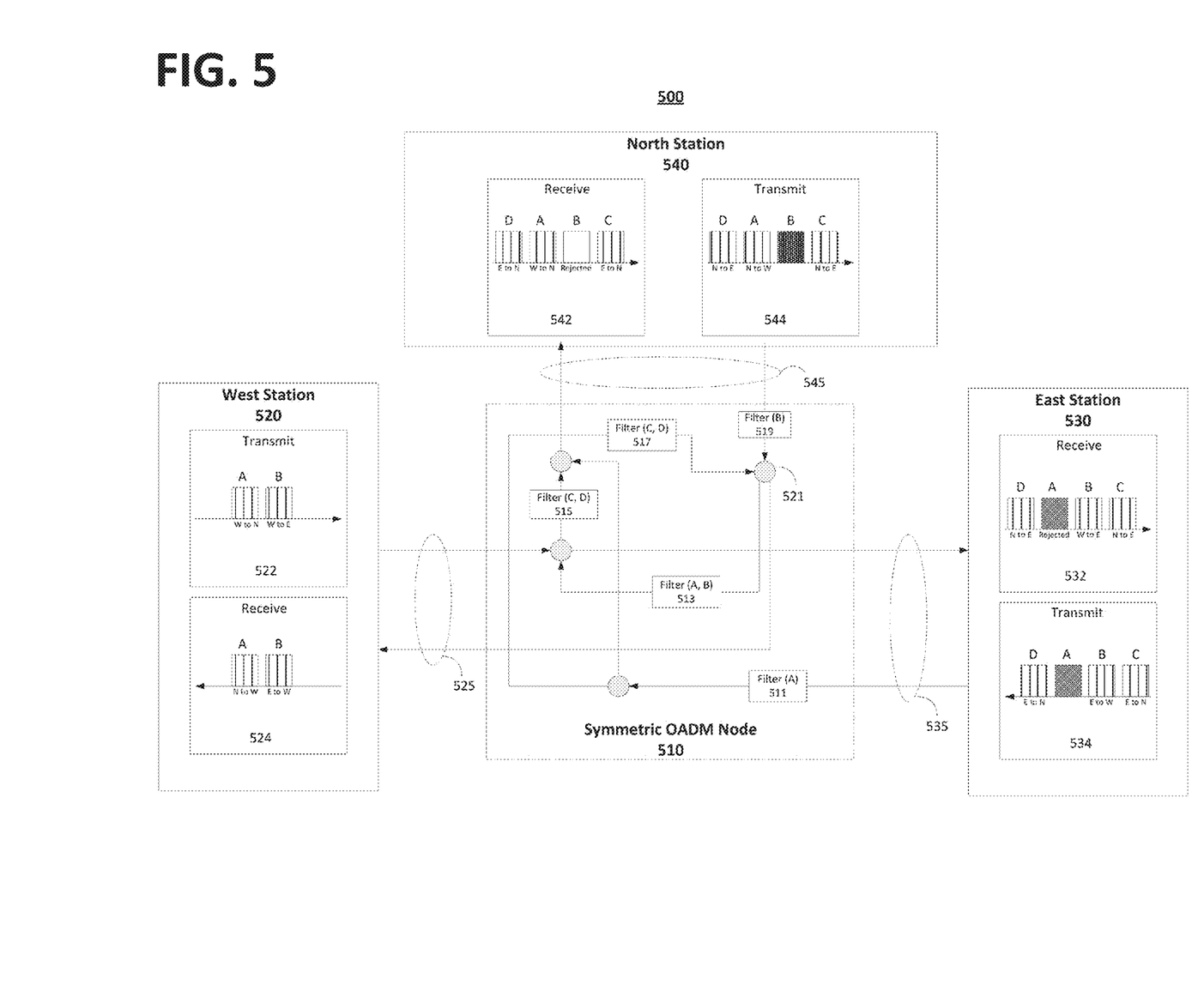
FIG. 5 illustrates an embodiment of a symmetric OADM node in accordance with an exemplary embodiment of the present disclosure.

FIG. 5 illustrates an embodiment of a fiber optic communications system 500 including a symmetric OADM node 510, which may be used to connect a legacy system and one or more newer, higher optical bandwidth, systems. Although system 500 and OADM node 510 shown in FIG. 5 have a limited number of elements in a certain topology, it may be appreciated that system 500 and OADM node 510 may include more or less elements in alternate topologies as desired for a given implementation. In an embodiment, only a single fiber pair 545 is needed within the North branch station 540 and between the North branch station 540 and OADM node 510 for each fiber pair in the trunk. In this manner, a symmetric number of fiber pairs are utilized to provide for higher fiber spectral efficiency and connectivity between all three stations. In an embodiment, the North branch station 540 is used more efficiently because it only needs a single fiber pair per fiber pair in the trunk. Because of this, less electronics, such as erbium-doped fiber amplifiers (EFDAs) and pump lasers are necessary along the segment connecting the North branch station 540 to the OADM node 510 via fiber pair 545. The fiber pair 545 within the North station is used more efficiently because each of the three optical bands A, C and D will carry data traffic. The B-band may be used for West-East connectivity along the trunk. Further, if a second fiber pair was to be included within the North station and between the North Station and OADM node 510, it may be utilized to carry additional traffic North-West and North-East using an additional symmetric OADM node, similar to symmetric OADM node 510.

Fiber optic communications system 500 may include West trunk station 520, which includes transmit module 522 and receive module 524. West trunk station 520 may interface with OADM node 510 over fiber pair segment 525. West trunk station 520 may be a legacy system supporting only two bands, A and B.

System 500 may further include East trunk station 530, which may include receive module 532 and transmit module 534. East trunk station 530 may interface with OADM node 510 over fiber pair segment 535. Fiber pair segments 525 and 535 may be segments of the same fiber pair. East trunk station 530 may be a newer, higher optical bandwidth, system capable of supporting higher bandwidth than a legacy system, such as West trunk station 520. East trunk station 530 may support four optical bands, A, B, C and D, for example. The four bands supported by East trunk station 530 may include the bands supported by West trunk station 520.

System 500 may include North branch station 540, which may include receive module 542 and transmit module 544. North branch station 540 may interface with OADM node 510 over fiber pair 545. North branch station 540 may be a newer, higher optical bandwidth, system capable of supporting a higher bandwidth than West trunk station 520. North branch station 540 may support four bands, A, B, C and D, for example. The four bands supported by North branch station 540 may be the same bands as supported by East trunk station 530 and may include the bands supported by West trunk station 520.

Bands within each transmit and receive module are coded to illustrate the bands transmitted or received. For example, striped bands, such as the A-band within receive module 542, indicate that data traffic is transmitted or received in a particular direction, labeled below. In the case of the A-band within module 542, data traffic is carried over the A-band from West trunk station 520 to North branch station 540. Shaded bands, such as the B-band of transmit module 544, indicate that only noise loading or continuous wave (CW) tones are transmitted or received. Blank bands, such as the B-band within receive module 542, indicate that the band may be blocked at the receive module since the band does not carry data traffic intended for the specific module. The embodiments are not limited by this example.

In an embodiment, OADM node 510 may include one or more couplers or splitters, such as coupler/splitter 521, for example. Coupler/splitter 521 may include one or more coupler or splitting devices, such that traffic along a fiber cable can be combined or split. OADM node 510 may include an interface configured to connect to fiber pair 525, 535 to carry traffic between West trunk station 520 and East trunk station 530. OADM node 510 may further include an interface configured to connect to fiber pair 545 to carry traffic between West trunk station 520 and North branch station 540 and between East trunk station 530 and North branch station 540.

In an embodiment, OADM node 510 may include one or more filters used to control the flow of traffic between the various stations. Each filter may include one or more filter devices capable of blocking or suppressing one or more optical bands. For example a filter (A) 511 may be used to suppress the A-band originating from East trunk station 530. Likewise, a filter (B) 519 may suppress B-band traffic originating from North branch station 540. A filter (A, B) 513 may be used to suppress both A and B bands, and so forth. Filters 511, 513, 515, 517 and 519 may be configured to provide connectivity between each combination of two stations among West trunk station 520, East trunk station 530 and North branch station 540 using a single fiber pair 525, 535 along the trunk and a single fiber pair 545 along the branch. For example, Filters 511, 513, 515, 517 and 519 may be configured to provide connectivity such that the D-band may be reserved for data traffic between East trunk station 530 and North branch station 540, the A-band may be reserved for data traffic between North branch station 540 and West trunk station 520, the B-band may be reserved for data traffic between West trunk station 520 and East trunk station 530, and the C-band may be reserved for data traffic between North branch station 540 and East trunk station 530. An exemplary filter configuration is illustrated within FIG. 5, however, it can be appreciated that alternative filter configurations may be used. The embodiments are not limited by this example.

In an embodiment, a series of bypass switches, such as those illustrated within FIG. 2, may be used within OADM node 510 to ensure that traffic would persist during one or more faults within the network. One or more bypass switches may be included within OADM node 510 to bypass any of filters 511, 513, 515, 517 or 519. Further, the number of bypass switches used may correspond to the number of bands supported by one or more of the trunk or branch stations.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
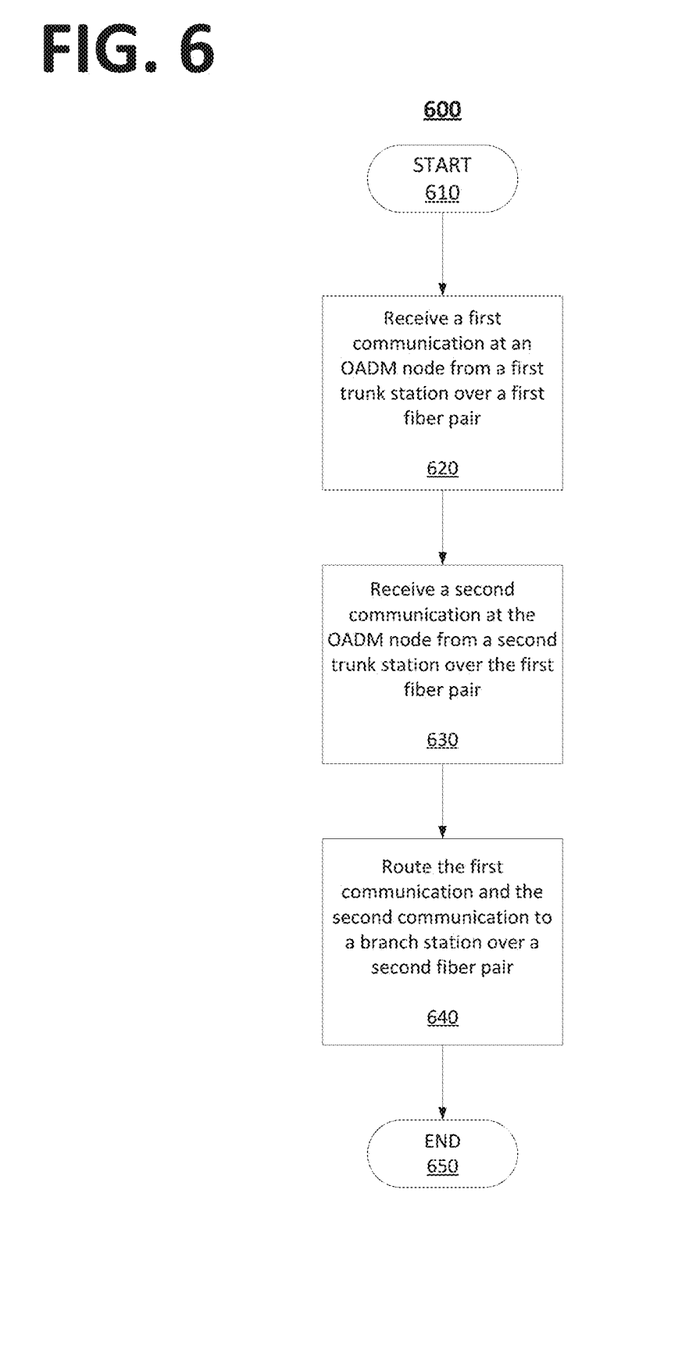
FIG. 6 illustrates a logic flow for an embodiment of a symmetric OADM node in accordance with an exemplary embodiment of the present disclosure.

FIG. 6 illustrates one embodiment of a logic flow 600. The logic flow 600 may be representative of some or all of the operations executed by one or more embodiments described herein. Block 610 begins logic flow 600. At block 620, logic flow 600 receives a first communication at an OADM node from a first trunk station over a first fiber pair. For example, a symmetric OADM node, such as that illustrated within FIG. 2 or 5, may receive data communications from a trunk station, such as West trunk station 260, or West trunk station 520, for example.

At block 630, logic flow 600 may receive a second communication at the OADM node from a second trunk station over the first fiber pair. For example, a symmetric OADM node, such as that illustrated within FIG. 2 or 5, may receive data communications from a trunk station, such as East trunk station 265 or East trunk station 530, for example.

At block 640, logic flow 600 may route the first communication and the second communication to a branch station over a second fiber pair. For example, a symmetric OADM node, such as that illustrated within FIG. 2 or 5, may route, using a plurality of filters, bidirectional communications from two different trunk stations to a branch station, such as South branch station 270 or North branch station 540, over a second, single, fiber pair. The symmetric OADM node also allows for bidirectional communication from a branch station, such as South branch station 270 or North branch station 540 to two different trunk stations. Each filter may include one or more filter devices capable of blocking or suppressing one or more optical bands.

In an embodiment, a series of bypass switches, such as those illustrated within FIG. 2, may be used within an OADM node to ensure that traffic would persist during one or more faults within the network. Further, the number of bypass switches used may correspond to the number of bands supported by one or more of the trunk or branch stations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An optical add/drop multiplexer (OADM) node, comprising:
   a first interface to a first number of fiber pairs connecting the OADM node to a first trunk station;
   a second interface to a second number of fiber pairs connecting the OADM node to a second trunk station;
   a third interface to a third number of fiber pairs connecting the first trunk station and the second trunk station with a branch station, wherein the third number of fiber pairs is equal to each of the second number of fiber pairs and the first number of fiber pairs; and
   a plurality of filters configured to provide connectivity between the first trunk station, the second trunk station and the branch station;
   wherein the first trunk station supports a first group of optical bands, the second trunk station supports a second group of optical bands, and the branch station supports the second group of optical bands; and
   wherein the first trunk station is a legacy station with a lower bandwidth capability than the second trunk station or the branch station.

2. The OADM node of claim 1, wherein the first group of optical bands includes a first optical band and a second optical band, and the second group of optical bands includes the first optical band, the second optical band, a third optical band, and a fourth optical band, wherein the first optical band carries data traffic between the branch station and the second trunk station, the second optical band carries data traffic between the branch station and the first trunk station, the third optical band carries data traffic between the first trunk station and the second trunk station, and the fourth optical band carries data traffic between the branch station and the second trunk station.

3. The OADM node of claim 1, further comprising a plurality of bypass switches, wherein each switch is configured to bypass one or more filters when a fault has been detected on the first, second, or third number of fiber pairs.

4. The OADM node of claim 3, wherein the plurality of bypass switches includes the same number of switches as optical bands supported by the first trunk station and the second trunk station.

5. The OADM node of claim 1, wherein the first trunk station, the second trunk station and the branch station each support a first optical band, a second optical band and a third optical band.

6. The OADM node of claim 5, wherein the first optical band carries data traffic between the branch station and the first trunk station, the second optical band carries data traffic between the first trunk station and the second trunk station, and the third optical band carries data traffic between the second trunk station and the branch station.

7. A system, comprising:
   a first trunk station;
   a second trunk station;
   a branch station;
   a first fiber pair;
   a second fiber pair; and
   an optical add/drop multiplexer (OADM) node, the OADM node comprising:
      a first interface to a first number of fiber pairs connecting the OADM node to a first trunk station;
      a second interface to a second number of fiber pairs connecting the OADM node to a second trunk station;

a third interface to a third number of fiber pairs connecting the first trunk station and the second trunk station with a branch station, wherein the third number of fiber pairs is equal to each of the second number of fiber pairs and the first number of fiber pairs; and a plurality of filters configured to provide connectivity between the first trunk station, the second trunk station and the branch station;

wherein the first trunk station supports a first group of optical bands, the second trunk station supports a second group of optical bands, and the branch station supports the second group of optical bands; and wherein the first trunk station is a legacy station with a lower bandwidth capability than the second trunk station or the branch station.

8. The OADM node of claim 7, wherein the first group of optical bands includes a first optical band and a second optical band, and the second group of optical bands includes the first optical band, the second optical band, a third optical band, and a fourth optical band, wherein the first optical band carries traffic between the branch station and the second trunk station, the second optical band carries traffic between the branch station and the first trunk station, the third optical band carries traffic between the first trunk station and the second trunk station, and the fourth optical band carries traffic between the branch station and the second trunk station.

9. The system of claim 7, wherein the OADM node further comprises:

a plurality of bypass switches, wherein each switch is configured to bypass one or more filters when a fault has been detected on the first, second, or third number of fiber pairs.

10. The OADM node of claim 9, wherein the plurality of bypass switches includes the same number of switches as bands supported by the first trunk station and the second trunk station.

11. The OADM node of claim 7, wherein the first trunk station, the second trunk station and the branch station each support a first optical band, a second optical band and a third optical band.

12. The OADM node of claim 11, wherein the first optical band carries traffic between the branch station and the first trunk station, the second optical band carries traffic between the first trunk station and the second trunk station, and the third optical band carries traffic between the second trunk station and the branch station.

13. A method for providing optical communications, comprising:

receiving a first communication at an optical add/drop multiplexer (OADM) node from a first trunk station over a first fiber pair;

receiving a second communication at the OADM node from a second trunk station over the first fiber pair; and routing the first communication and the second communication to a branch station over a second fiber pair;

wherein a first number of fiber pairs extending between the first trunk station and the OADM node is equal to each of a second number of fiber pairs extending between the OADM node and the second trunk station and a third number of fiber pairs extending between the OADM node and the branch station;

wherein the first trunk station supports a first group of optical bands, the second trunk station supports a second group of optical bands, and the branch station supports the second group of optical bands; and wherein the first trunk station is a legacy station with a lower bandwidth capability than the second trunk station or the branch station.

14. The method of claim 13, wherein the OADM node comprises a plurality of filters configured to provide connectivity between the first trunk station, the second trunk station and the branch station.

15. The method of claim 13, wherein the OADM node comprises a plurality of bypass switches, wherein each switch is configured to bypass one or more filters when a fault has been detected on the first fiber pair or the second fiber pair.

16. The method of claim 13, wherein the first trunk station, the second trunk station and the branch station each support a first optical band, a second optical band and a third optical band.

17. The method of claim 16, wherein the first optical band carries traffic between the branch station and the first trunk station, the second optical band carries traffic between the first trunk station and the second trunk station, and the third optical band carries traffic between the second trunk station and the branch station.

18. The method of claim 13, wherein the first group of optical bands includes a first optical band and a second optical band, and the second group of optical bands includes the first optical band, the second optical band, a third optical band, and a fourth optical band, wherein the first band carries traffic between the branch station and the second trunk station, the second band carries traffic between the branch station and the first trunk station, the third band carries traffic between the first trunk station and the second trunk station, and the fourth band carries traffic between the branch station and the second trunk station.

* * * * *